(12) United States Patent
Ichikawa et al.

(10) Patent No.: US 10,079,556 B2
(45) Date of Patent: Sep. 18, 2018

(54) INVERTER DEVICE

(71) Applicant: Mitsubishi Electric Corporation, Tokyo (JP)

(72) Inventors: Takahiro Ichikawa, Tokyo (JP); Hiroshi Moroi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/522,149

(22) PCT Filed: Jan. 30, 2015

(86) PCT No.: PCT/JP2015/052729
§ 371 (c)(1),
(2) Date: Apr. 26, 2017

(87) PCT Pub. No.: WO2016/121113
PCT Pub. Date: Aug. 4, 2016

(65) Prior Publication Data
US 2017/0331391 A1    Nov. 16, 2017

(51) Int. Cl.
*H02M 7/48* (2007.01)
*H02P 27/06* (2006.01)

(52) U.S. Cl.
CPC .............. *H02M 7/48* (2013.01); *H02P 27/06* (2013.01)

(58) Field of Classification Search
CPC .................................. H02M 7/48; H02P 27/06
See application file for complete search history.

(56) References Cited

U.S. PATENT DOCUMENTS 5,247,237 A    9/1993   Koyama et al.
5,481,168 A *  1/1996   Mutoh .................. B60L 15/025
                                                    318/432
(Continued)

FOREIGN PATENT DOCUMENTS

JP    60-098893 A    6/1985
JP    64-069293 A    3/1989
(Continued)

OTHER PUBLICATIONS

U.S. Appl. No. 15/516,097, filed Mar. 31, 2017.
International Search Report for PCT/JP2015/052729, dated Apr. 28, 2015.

*Primary Examiner* — Adolf Berhane
*Assistant Examiner* — Bart Iliya
(74) *Attorney, Agent, or Firm* — Sughrue Mion, PLLC; Richard C. Turner (57) ABSTRACT

An inverter includes: a converter circuitry to convert an alternating-current voltage to a direct-current voltage; an inverter circuitry to convert a direct-current voltage obtained by conversion by the converter circuitry to an alternating-current voltage and to supply the alternating-current voltage obtained by conversion to a load; a current detector to detect an output current of the inverter circuitry; a calculator to calculate an output frequency based on the output current detected by the current detector, and a pulse-signal outputter to output a pulse signal based on the output frequency calculated by the calculator. The inverter circuitry converts the direct-current voltage obtained by conversion by the converter circuitry to the alternating-current voltage based on the pulse signal output from the pulse-signal outputter, so as to obtain a frequency corresponding to the magnitude of the load.

4 Claims, 8 Drawing Sheets

(56) References Cited

U.S. PATENT DOCUMENTS

| | | | |
|---|---|---|---|
| 5,723,968 | A | 3/1998 | Sakurai |
| 5,986,428 | A * | 11/1999 | Kono .................. H02P 23/20 318/802 |
| 6,229,719 | B1 * | 5/2001 | Sakai .................. H02P 21/22 318/432 |
| 2002/0087252 | A1 * | 7/2002 | Shimizu .............. B60K 6/44 701/84 |
| 2011/0219816 | A1 * | 9/2011 | Tanaka ................ H02P 6/18 62/498 |
| 2015/0236623 | A1 * | 8/2015 | Kitanaka ............. H02P 5/74 318/812 |

FOREIGN PATENT DOCUMENTS

| | | | |
|---|---|---|---|
| JP | 05-068398 | A | 3/1993 |
| JP | 09-285185 | A | 10/1997 |
| JP | 10-191689 | A | 7/1998 |
| JP | 3295553 | B2 | 6/2002 |
| JP | 2002-325492 | A | 11/2002 |
| JP | 4174632 | B2 | 11/2008 |
| JP | 4662248 | B2 | 3/2011 |
| JP | 2011-239660 | A | 11/2011 |

\* cited by examiner

INVERTER DEVICE

This is a National Stage of International Application No. PCT/JP2015/052729 filed Jan. 30, 2015, the contents of all of which are incorporated herein by reference in their entirety.

FIELD

The present invention relates to an inverter device that converts a direct-current (DC) voltage to an alternating-current (AC) voltage.

BACKGROUND

An inverter device controls an elevating speed of an elevator, a crane, a multistory parking lot, and a printing machine by adjusting a voltage and a frequency.

Patent Literature 1 discloses an inverter device that suppresses an over-torque state of an induction motor for winding up or rewinding a cable of a winch. When a torque current detected by a torque-current detecting circuit exceeds a set level and the induction motor becomes in the over-torque state, the inverter device described in Patent Literature 1 determines a frequency and a voltage of an AC voltage to be generated by an inverter based on a speed of the induction motor output from a speed detector.

CITATION LIST

Patent Literature

Patent Literature 1: Japanese Patent Application Laid-open No. H10-191689

SUMMARY

Technical Problem

However, because the inverter device described in Patent Literature 1 determines the frequency based on the speed of the induction motor when being in the over-torque state, there is a possibility that a large change of a load occurs and it takes much time to reach a frequency corresponding to the magnitude of a load.

The present invention has been achieved in view of the above problems, and an object of the present invention is to provide an inverter device that can perform adjustment to obtain a frequency corresponding to the magnitude of a load without being affected by a load change.

Solution to Problem

To solve the above problems and achieve the object an inverter device according to the present invention includes: a converter circuit unit to convert an alternating-current voltage to a direct-current voltage; an inverter circuit unit to convert a direct-current voltage obtained by conversion by the converter circuit unit to an alternating-current voltage and to supply the alternating-current voltage obtained by conversion to a load; a current detecting unit to detect an output current of the inverter circuit unit; a calculating unit to calculate an output frequency based on the output current detected by the current detecting unit; and a pulse-signal output unit to output a pulse signal based on the output frequency calculated by the calculating unit. The inverter circuit unit converts the direct-current voltage obtained by conversion by the converter circuit unit to an alternating-current voltage with a frequency corresponding to the load based on the pulse signal output by the pulse-signal output unit.

Advantageous Effects of Invention

The inverter device according to the present invention can perform adjustment to obtain a frequency corresponding to the magnitude of a load without being affected by a load change.

DESCRIPTION OF EMBODIMENTS

Exemplary embodiments of an inverter device according to the present invention will be explained below in detail with reference to the accompanying drawings. The present invention is not limited to the embodiments.

First Embodiment

Figure 1:
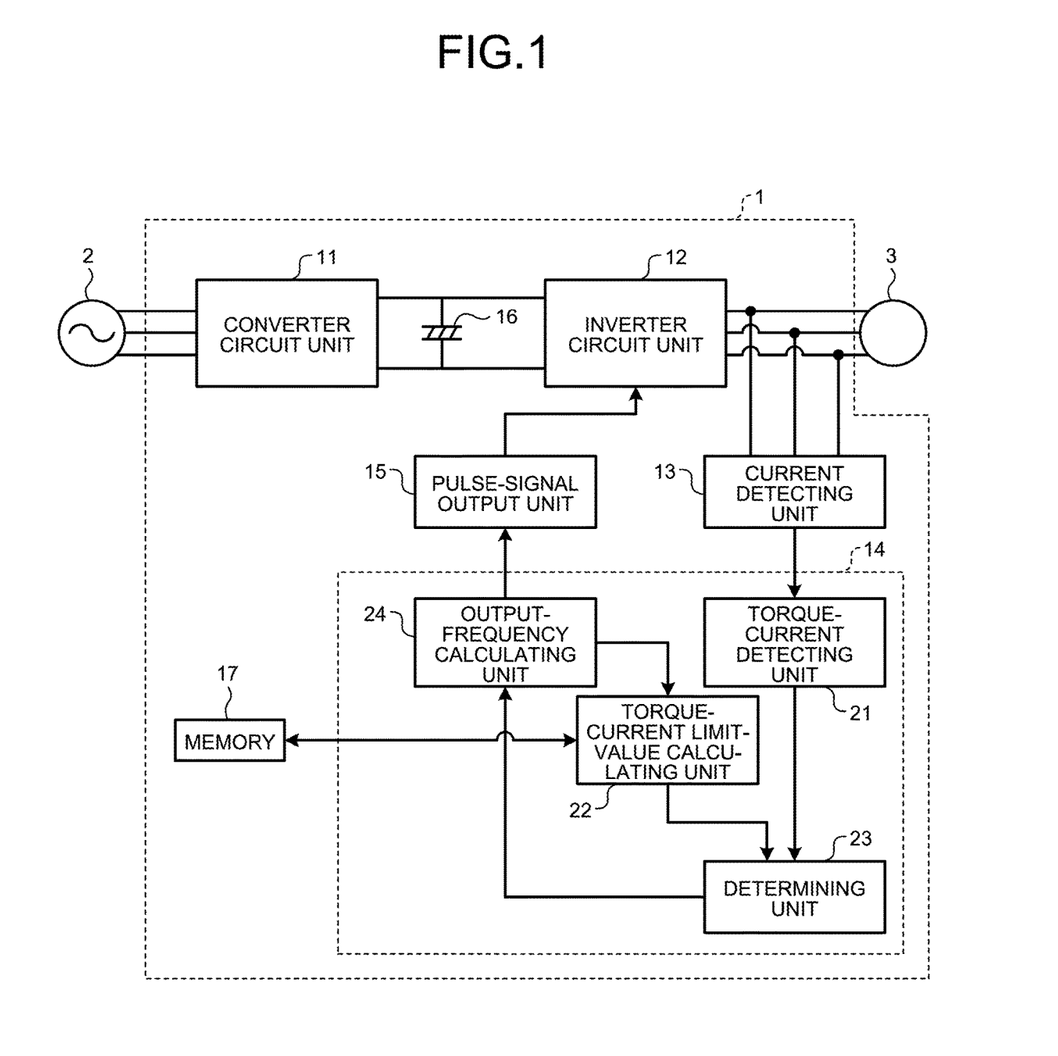
FIG. 1 is a configuration diagram of an inverter device according to a first embodiment.
Figure 2:
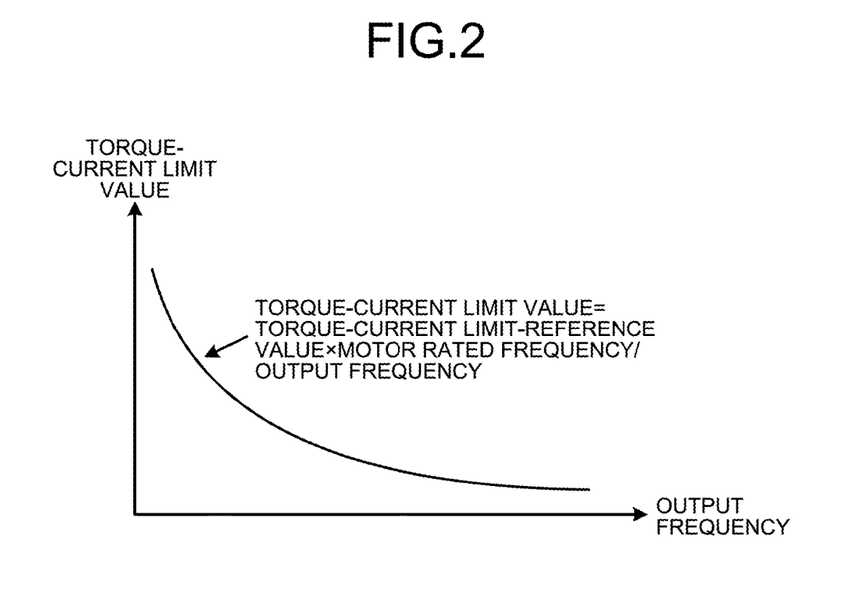
FIG. 2 is an explanatory diagram of a procedure of calculating a torque-current limit value performed by a torque-current limit-value calculating unit according to the first embodiment.
Figure 3:
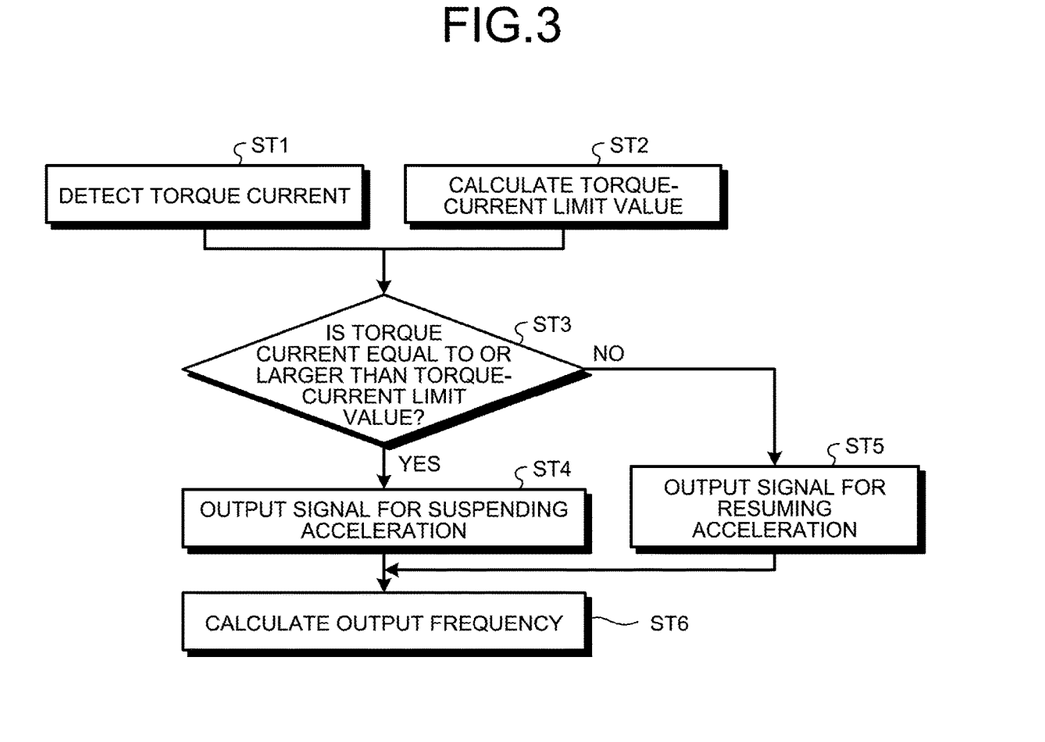
FIG. 3 is a flowchart for explaining an operation of a calculating unit according to the first embodiment.
Figure 4:
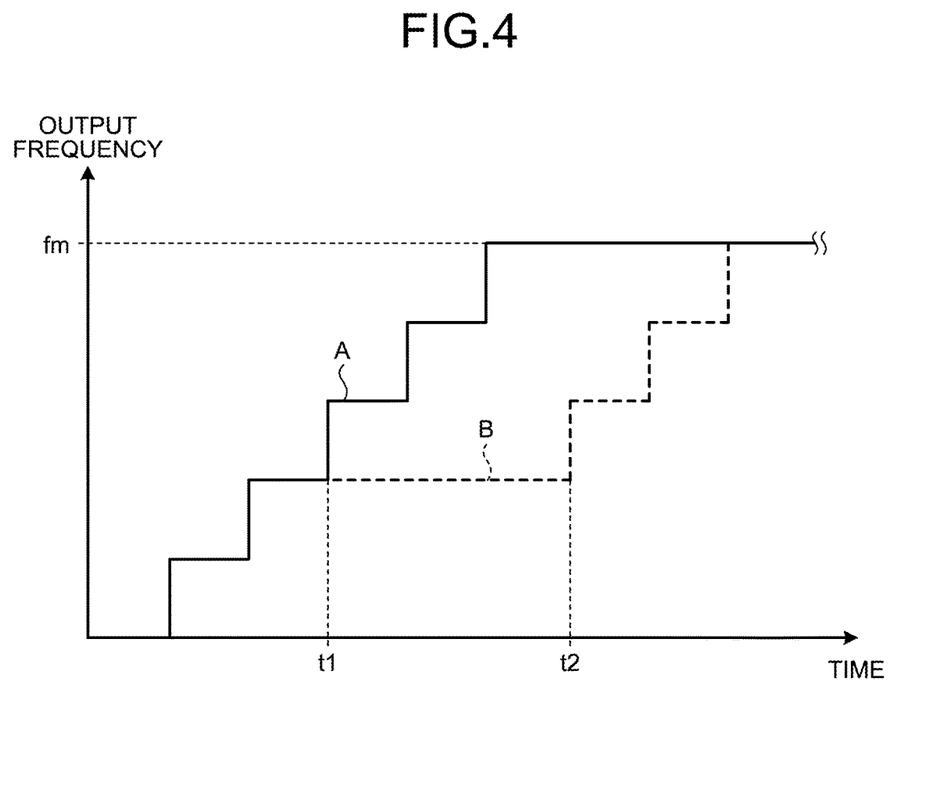
FIG. 4 is an explanatory diagram of an operation of an output-frequency calculating unit according to the first embodiment.
Figure 5:
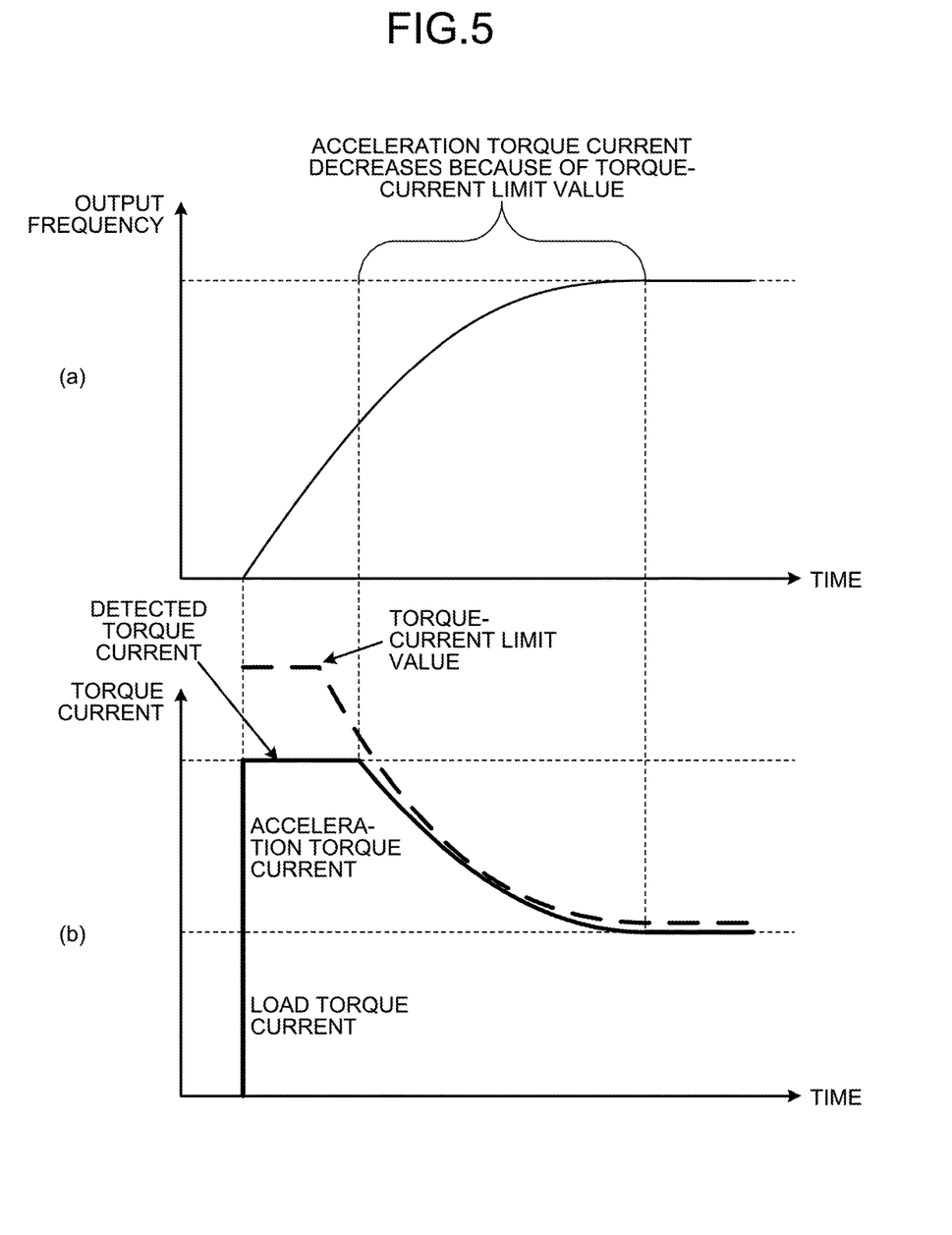
FIG. 5 is an explanatory diagram of a relation between an output frequency and a torque current according to the first embodiment.

FIG. 1 is a diagram illustrating a configuration of an inverter device 1 according to a first embodiment. FIG. 2 is a diagram illustrating a relation between a torque-current limit value and an output frequency according to the first embodiment. FIG. 3 is a flowchart for explaining an operation of a calculating unit according to the first embodiment. FIG. 4 is an explanatory diagram of an operation of an output-frequency calculating unit according to the first embodiment. FIG. 5 is an explanatory diagram of a relation between an output frequency and a torque current according to the first embodiment.

The inverter device 1 converts an AC voltage supplied from an AC power source 2 to a DC voltage, converts the DC voltage obtained by the conversion to an AC voltage again, and supplies the AC voltage obtained by the conversion to a motor 3. The inverter device 1 includes a converter circuit unit 11 that converts an AC voltage to a DC voltage, an inverter circuit unit 12 that converts a DC voltage to an AC voltage, a current detecting unit 13 that detects an output current of the inverter circuit unit 12, a calculating unit 14 that calculates an output frequency, and a pulse-signal output unit 15 that outputs a pulse signal. A smoothing capacitor 16 that smooths the DC voltage obtained by conversion by the converter circuit unit 11 is inserted between the converter circuit unit 11 and the inverter circuit unit 12. The inverter device 1 also includes a memory 17. The memory 17 holds therein a torque-current limit-reference value and a motor rated frequency that is a rated frequency of the motor 3, and details thereof will be described later.

The inverter circuit unit 12 converts the DC voltage obtained by conversion by the converter circuit unit 11 to an AC voltage with a frequency corresponding to the motor 3 being a load based on the pulse signal output from the pulse-signal output unit 15, and supplies the AC voltage after conversion to the motor 3. Specifically, the inverter circuit unit 12 variably controls a frequency and a voltage of the AC voltage under VVVF (Variable Voltage Variable Frequency) control.

The current detecting unit 13 detects phase currents of a U-phase, a V-phase, and a W-phase output from the inverter circuit unit 12. These phase currents are collectively referred to as "output current".

The calculating unit 14 calculates an output frequency based on the output current detected by the current detecting unit 13. Detailed configurations of the calculating unit 14 will be described later.

The pulse-signal output unit 15 outputs a pulse signal to the inverter circuit unit 12 based on the output frequency calculated by the calculating unit 14. The pulse signal is a signal subjected to pulse width modulation. The output frequency is also referred to as "frequency instruction value".

The configuration of the calculating unit 14 is described below. The calculating unit 14 includes: a torque-current detecting unit 21 that detects a torque current; a torque-current limit-value calculating unit 22 that calculates a torque-current limit value; a determining unit 23 that determines whether to suspend or resume acceleration of a load; and an output-frequency calculating unit 24 that calculates an output frequency.

The torque-current detecting unit 21 detects the torque current based on the output current detected by the current detecting unit 13. Specifically, the torque-current detecting unit 21 performs d-q coordinate transformation based on the output current detected by the current detecting unit 13 to detect the torque current.

The torque-current limit-value calculating unit 22 calculates the torque-current limit value based on the output frequency. A procedure of calculating the torque-current limit value performed by the torque-current limit-value calculating unit 22 is described below. The torque-current limit value decreases as the output frequency increases, as illustrated in FIG. 2.

The torque-current limit-value calculating unit 22 substitutes the torque-current limit-reference value and the motor rated frequency read from the memory 17 and the output frequency input from the output-frequency calculating unit 24 into expression (1) to calculate the torque-current limit value. The torque-current limit value is a value decreasing with reduction of a magnetic flux of the motor 3.

Torque-current limit value=torque-current limit-reference value×motor rated frequency/output frequency  (1)

The determining unit 23 determines whether to suspend or resume acceleration of the load based on the torque current and the torque-current limit value. Specifically, the determining unit 23 outputs a signal for suspending acceleration to the output-frequency calculating unit 24 when the torque current is equal to or larger than the torque-current limit value, and outputs a signal for resuming acceleration to the output-frequency calculating unit 24 when the torque current is smaller than the torque-current limit value. While it is assumed in the following descriptions that the signal for suspending acceleration is "0" and the signal for resuming acceleration is "1", the signals may be any signals as long as results of determination can be distinguished from each other and output to the output-frequency calculating unit 24, and the signals are not limited to "0" and "1".

The output-frequency calculating unit 24 calculates the output frequency based on the determination by the determining unit 23. The output-frequency calculating unit 24 outputs the calculated output frequency to the pulse-signal output unit 15.

A specific operation of the calculating unit 14 is described below with reference to the flowchart illustrated in FIG. 3.

At Step ST1, the torque-current detecting unit 21 detects a torque current based on an output current detected by the current detecting unit 13.

At Step ST2, the torque-current limit-value calculating unit 22 calculates a torque-current limit value based on an output frequency.

At Step ST3, the determining unit 23 determines whether the torque current is equal to or larger than the torque-current limit value. When determining that the torque current is equal to or larger than the torque-current limit value (YES), the process proceeds to Step ST4. When determining that the torque current is not equal to or larger than the torque-current limit value, that is, the torque current is smaller than the torque-current limit value (NO), the process proceeds to Step ST5.

At Step ST4, the determining unit 23 outputs the signal for suspending acceleration to the output-frequency calculating unit 24.

At Step ST5, the determining unit 23 outputs the signal for resuming acceleration to the output-frequency calculating unit 24.

At Step ST6, the output-frequency calculating unit 24 calculates an output frequency based on the determination by the determining unit 23.

A specific operation of the output-frequency calculating unit 24 is described below. In the following descriptions, it is assumed that the signal for suspending acceleration is input at a time t1 and the signal for resuming acceleration is input at a time t2.

The output-frequency calculating unit 24 outputs an output frequency that is increased at a constant rate at constant time intervals to the pulse-signal output unit 15 until the output frequency reaches a target output frequency fm as illustrated in FIG. 4, when no signal from the determining unit 23 is input or when the signal for resuming acceleration is input. "A" in FIG. 4 represents a waveform of the output frequency in a case where the output frequency is increased to the target output frequency fm without suspending acceleration. B in FIG. 4 represents a waveform of the output frequency in a case where the output frequency is increased to the target output frequency fm while acceleration is suspended and resumed.

When the signal for suspending acceleration is input from the determining unit 23 at the time t1, the output-frequency calculating unit 24 does not increase the output frequency and outputs the output frequency with the same value to the pulse-signal output unit 15. When the signal for resuming acceleration is input from the determining unit 23 at the time t2, the output-frequency calculating unit 24 outputs the output frequency that is increased at the constant rate to the pulse-signal output unit 15.

A relation between the output frequency and the torque current is described below. The output frequency increases until the torque current reaches a torque-current limit value or a higher value as illustrated in FIG. 5(a). The torque current is obtained by adding a load torque current and an acceleration torque current as illustrated in FIG. 5(b).

The determining unit 23 suspends acceleration when the torque current becomes the torque-current limit value or a higher value. The torque current decreases by the acceleration torque current because of suspension of acceleration.

When the torque current falls below the torque-current limit value because of decrease of the torque current, the determining unit 23 resumes acceleration. The output frequency rises because of resumption of acceleration.

When the acceleration torque current no longer flows and the torque current is not decreased even by suspension of acceleration, the output frequency no longer rises. That is, a frequency at which the output frequency becomes constant is the target output frequency fm. When the output frequency reaches the target output frequency fm, the output-frequency calculating unit 24 continues to output the constant output frequency to the pulse-signal output unit 15 so that that output frequency fm is maintained.

When a torque current becomes equal to or larger than a torque-current limit value, the inverter device 1 suspends acceleration to cause an output frequency to be constant so that an acceleration torque is reduced and the torque current is decreased. When the torque current falls below the torque-current limit value, the inverter device 1 resumes acceleration to raise the output frequency. By doing these operations, the inverter device 1 finally sets the torque current to be equal to the torque-current limit value.

Therefore, the inverter device 1 can perform adjustment to obtain an output frequency corresponding to a load without being affected by a load change during acceleration.

Second Embodiment

Figure 6:
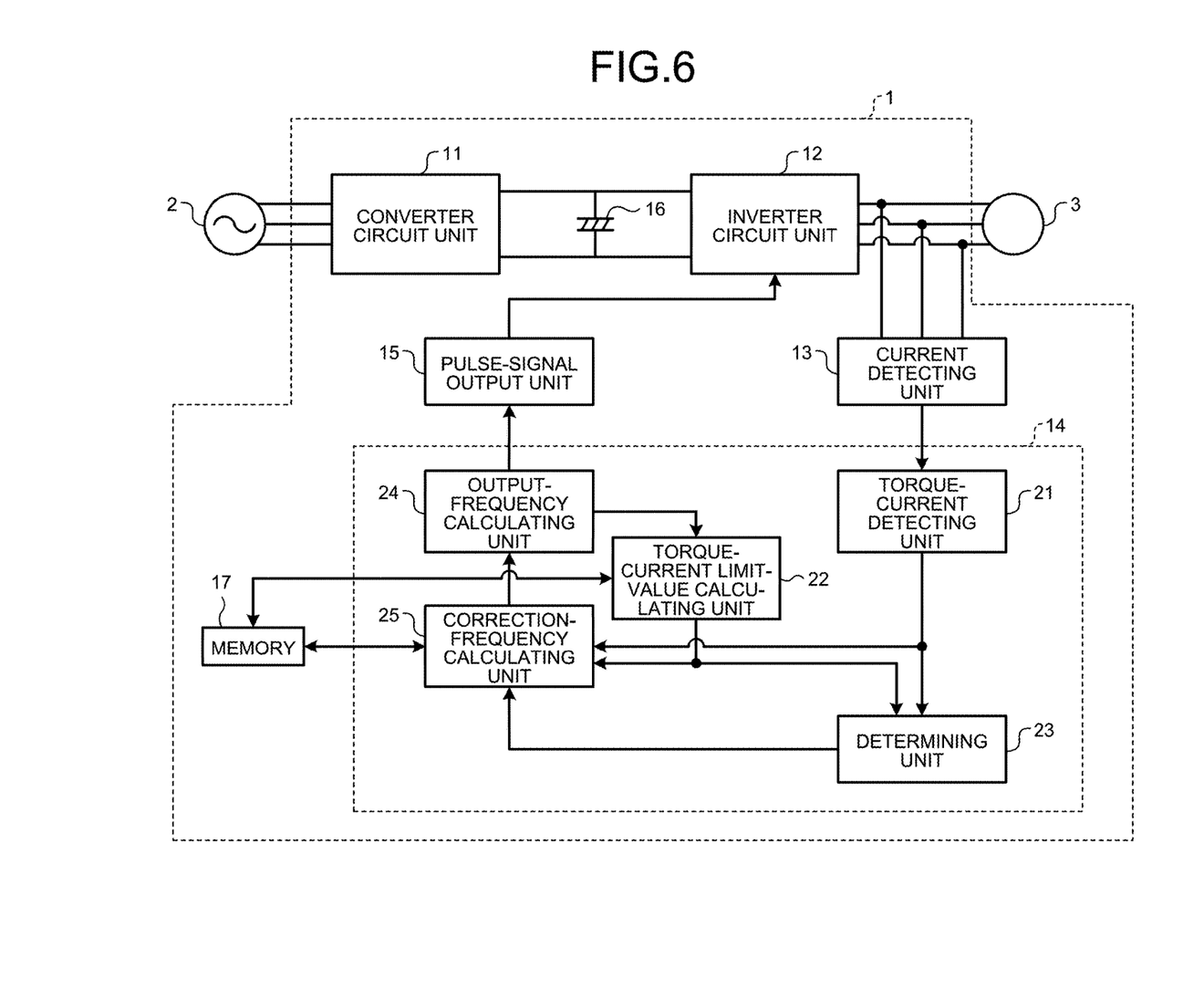
FIG. 6 is a configuration diagram of an inverter device according to a second embodiment.

A configuration and an operation of the inverter device 1 after an output frequency reaches the target output frequency fm are described next. The inverter device 1 according to a second embodiment is obtained by adding a correction-frequency calculating unit 25 to the configuration of the first embodiment. The configuration other than the correction-frequency calculating unit 25 is the same as that described in the first embodiment, and therefore like reference signs are given to omit the descriptions. The memory 17 holds therein the torque-current limit-reference value, the motor rated frequency, and a correction coefficient, and details thereof will be described later.

Figure 7:
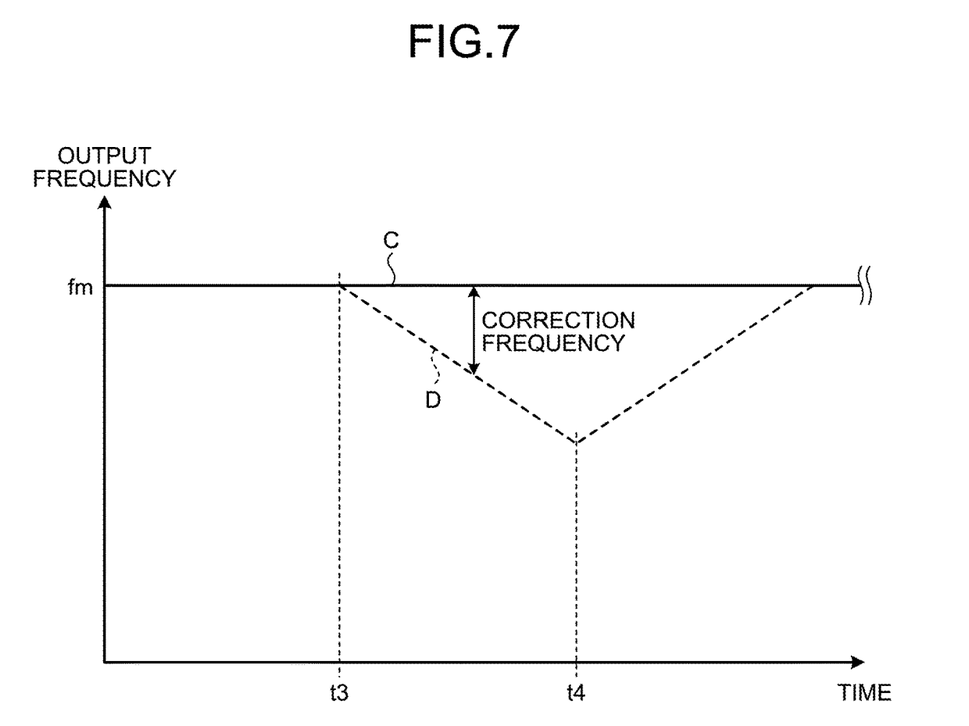
FIG. 7 is an explanatory diagram of a procedure of calculating a correction frequency performed by a correction-frequency calculating unit according to the second embodiment.
Figure 8:
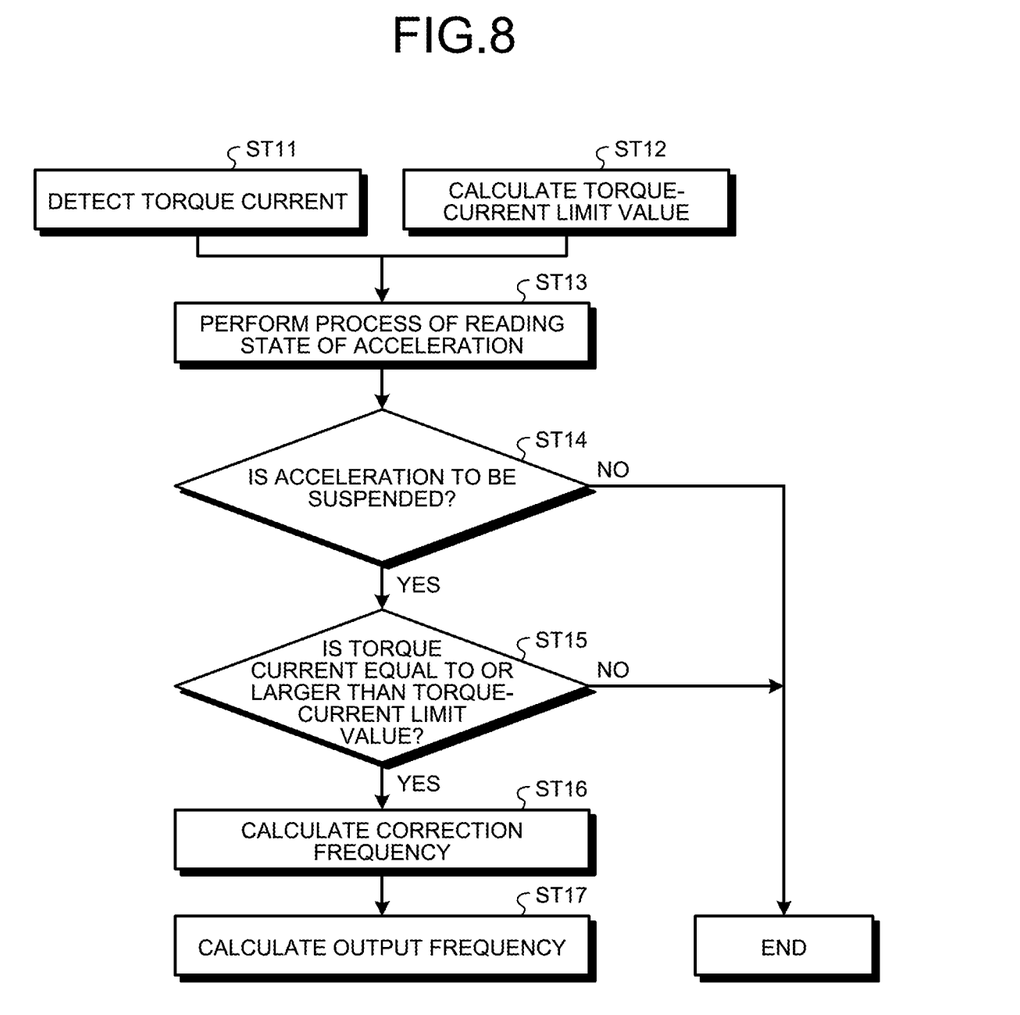
FIG. 8 is a flowchart for explaining an operation of a calculating unit according to the second embodiment.
Figure 9:
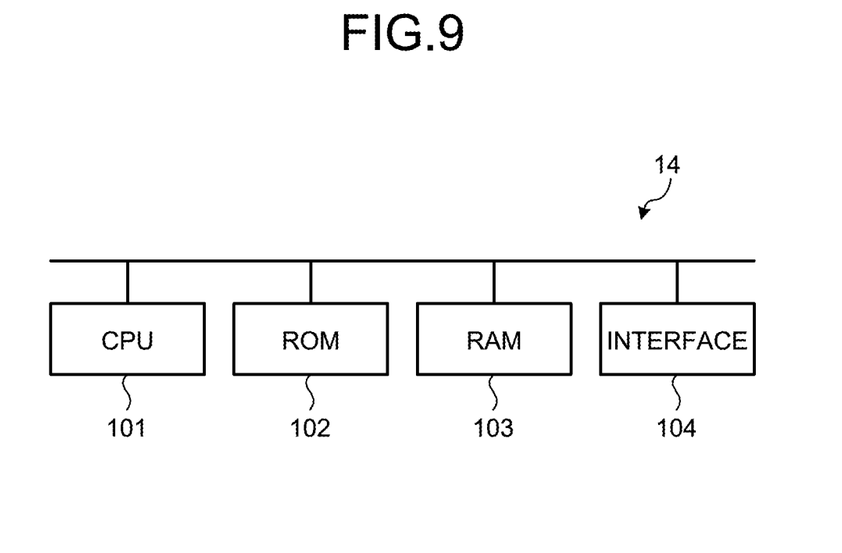
FIG. 9 is a block diagram illustrating a configuration of the calculating unit according to the second embodiment.

FIG. 6 is a diagram illustrating a configuration of the inverter device 1 according to the second embodiment. FIG. 7 is an explanatory diagram of a procedure of calculating a correction frequency performed by the correction-frequency calculating unit 25 according to the second embodiment. FIG. 8 is a flowchart for explaining an operation of the calculating unit 14 according to the second embodiment. FIG. 9 is a block diagram illustrating a configuration of the calculating unit 14 according to the second embodiment.

The calculating unit 14 further includes the correction-frequency calculating unit 25 that calculates a correction frequency based on a torque current and a torque-current limit value, as illustrated in FIG. 6.

The torque-current detecting unit 21 detects a torque current based on an output current detected by the current detecting unit 13, and outputs the detected torque current to the correction-frequency calculating unit 25.

The torque-current limit-value calculating unit 22 calculates a torque-current limit value based on an output frequency, and outputs the calculated torque-current limit value to the correction-frequency calculating unit 25.

The determining unit 23 outputs a trigger signal to the correction-frequency calculating unit 25 when the torque current is no longer decreased even by suspension of acceleration of the motor 3 being a load, that is, when the determining unit 23 determines that the torque current is not equal to or larger than the torque-current limit value.

The correction-frequency calculating unit 25 outputs a correction frequency calculated based on the torque current and the torque-current limit value to the output-frequency calculating unit 24 when the trigger signal is input from the determining unit 23.

The output-frequency calculating unit 24 calculates an output frequency based on the correction frequency and outputs the calculated output frequency to the pulse-signal output unit 15.

A procedure of calculating a correction frequency performed by the correction-frequency calculating unit 25 is described below. In the following descriptions, it is assumed that a trigger signal for starting correction is input from the determining unit 23 at a time t3 and a trigger signal for ending correction is input from the determining unit 23 at a time t4, as illustrated in FIG. 7. C in FIG. 7 represents a waveform of the output frequency in a case where no trigger signal is input. D in FIG. 7 represents a waveform of the output frequency in a case where the trigger signal is input.

The correction-frequency calculating unit 25 corrects the output frequency to suppress rise of the torque current when a load becomes large during an operation of the motor 3 at a constant speed after suspension of acceleration. Specifically, the correction-frequency calculating unit 25 reads out the torque-current limit-reference value, the motor rated frequency, and the correction coefficient from the memory 17. The correction-frequency calculating unit 25 substitutes the torque-current limit-reference value, the motor rated frequency, the correction coefficient, the torque current input from the torque-current detecting unit 21, and the torque-current limit value input from the torque-current limit-value calculating unit 22 into expression (2) to calculate the correction frequency.

$$\text{Correction frequency} = ((\text{torque current} - \text{torque-current limit value})/(\text{torque-current limit-reference value}) \times \text{motor rated frequency} \times \text{correction coefficient} \qquad (2)$$

A specific operation of the calculating unit 14 is described next with reference to the flowchart illustrated in FIG. 8.

At Step ST11, the torque-current detecting unit 21 detects a torque current based on an output current detected by the current detecting unit 13.

At Step ST12, the torque-current limit-value calculating unit 22 calculates a torque-current limit value based on an output frequency.

At Step ST13, the determining unit 23 performs a process of reading a state of acceleration based on the torque current and the torque-current limit value.

At Step ST14, the determining unit 23 determines whether to suspend acceleration based on the process of reading the state of acceleration. When acceleration is to be suspended (YES), the process proceeds to Step ST15. When acceleration is not to be suspended (NO), a series of processes is ended.

At Step ST15, the determining unit 23 determines whether the torque current is equal to or larger than the torque-current limit value. When the torque current is determined as being equal to or larger than the torque-current limit value (YES), the process proceeds to Step ST16. When it is determined that the torque current is not equal to or larger than the torque-current limit value, that is, the torque current is smaller than the torque-current limit value (NO), a series of processes is ended. The determining unit 23 outputs the trigger signal to the correction-frequency calculating unit 25 when determining that the torque current is equal to or larger than the torque-current limit value at this step.

At Step ST16, the correction-frequency calculating unit 25 calculates a correction frequency based on the torque current and the torque-current limit value and outputs the correction frequency to the output-frequency calculating unit 24, when the trigger signal is input from the determining unit 23.

At Step ST17, the output-frequency calculating unit 24 calculates an output frequency based on the correction frequency, and outputs the calculated output frequency to the pulse-signal output unit 15.

The inverter device 1 calculates an output frequency based on a correction frequency, while the motor 3 is operated at a constant speed after a torque current becomes equal to a torque-current limit value and acceleration is suspended. Therefore, it is possible to suppress a load change and prevent the motor 3 from stopping because of an overload.

The calculating unit 14 according to the first and second embodiments described above may be configured by a CPU 101 that performs computing, a ROM 102 that has programs to be read by the CPU 101 stored therein, a RAM 103 in which the programs stored in the ROM 102 are to be developed, and an interface 104 that performs input and output of signals, as illustrated in FIG. 9. Each constituent element of the calculating unit 14 is programmed and is stored in the ROM 102. The interface 104 receives input of an output signal from the current detecting unit 13, and outputs an output frequency to the pulse-signal output unit 15.

The CPU 101 reads the programs stored in the ROM 102, develops the read programs in the RAM 103, and performs computing based on an output signal input from the current detecting unit 13 and data held in the memory 17 to obtain an output frequency described above. The output frequency calculated by the CPU 101 is output to the pulse-signal output unit 15 via the interface 104.

The configurations described in the above embodiments are only examples of the contents of the present invention and can be combined with other known techniques. A part of the configurations can be omitted or modified without departing from the scope of the present invention.

REFERENCE SIGNS LIST 1 inverter device
2 AC power source
3 motor
11 converter circuit unit
12 inverter circuit unit
13 current detecting unit
14 calculating unit
15 pulse-signal output unit
16 smoothing capacitor
17 memory
21 torque-current detecting unit
22 torque-current limit-value calculating unit
23 determining unit
24 output-frequency calculating unit
25 correction-frequency calculating unit

The invention claimed is:

1. An inverter comprising:
a converter circuitry to convert an alternating-current voltage to a direct-current voltage;
an inverter circuitry to convert a direct-current voltage obtained by conversion by the converter circuitry to an alternating-current voltage and to supply the alternating-current voltage obtained by conversion to a load;
a current detector to detect an output current of the inverter circuitry;
a torque-current detector to detect a torque current based on the output current detected by the current detector;
a torque-current limit-value calculator to calculate a torque-current limit value based on an output frequency;
a determiner to determine whether to suspend or resume acceleration of the load based on the torque current and the torque-current limit value, and output signal for suspending acceleration of the load or a signal for resuming acceleration of the load;
an output-frequency calculator to calculate the output frequency based on determination by the determiner; and
a pulse-signal outputter to output a pulse signal based on the output frequency calculated by the output-frequency calculator, wherein
the output-frequency calculator outputs the output frequency without increase upon reception of the signal for suspending acceleration of the load from the determiner, and outputs the output frequency that is increased upon reception of the signal for resuming acceleration of the load from the determiner, and
the inverter circuitry converts the direct-current voltage obtained by conversion by the converter circuitry-to an alternating-current voltage with a frequency corresponding to the load based on the pulse signal output by the pulse-signal outputter.

2. The inverter according to claim 1, further comprising:
a correction-frequency calculator to calculate a correction frequency based on the torque current and the torque-current limit value, wherein
the determiner outputs a trigger signal to the correction-frequency calculator, when acceleration of the load is suspended and the determiner determines that the torque current is equal to or larger than the torque-current limit value,
the correction-frequency calculator outputs the correction frequency to the output-frequency calculator, when the trigger signal is input, and
the output-frequency calculator calculates an output frequency based on the correction frequency.

3. The inverter according to claim 1, wherein,
when the torque current that is detected by the torque-current detector does not decrease even when acceleration is suspended, the output-frequency calculator continues to output the output frequency with a constant value to the pulse-signal outputter to maintain the output frequency.

4. The inverter according to claim 1, further comprising a memory to store a torque-current limit-reference value, and the torque-current limit-value is calculated based on the torque-current limit-reference value and the output frequency.

* * * * *